United States Patent Office 2,811,476
Patented Oct. 29, 1957

2,811,476

PHOSPHORUS DERIVATIVES, PROCESS FOR THEIR PREPARATION, AND COMPOSITIONS CONTAINING THEM

Jean Metivier, Arpajon, France, assignor to Societe des Usines Chimiques Rhone-Poulenc, Paris, France, a corporation of France No Drawing. Application May 14, 1956, Serial No. 584,426

Claims priority, application Great Britain April 1, 1954

4 Claims. (Cl. 167—33)

This invention relates to a new phosphorus derivative, to processes for its production and to industrially useful compositions containing the same.

The application is a continuation-in-part of application No. 496,941, filed March 25, 1955, now U. S. Patent No. 2,752,283.

In the said application Serial No. 496,941 there is described a class of new phosphorus derivatives of γ-pyrone conforming to the formula

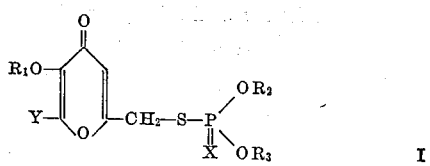

I in which X represents an oxygen or sulphur atom, Y represents a hydrogen or halogen atom, R₁ represents a hydrogen atom or an alkyl group containing not more than four carbon atoms, and R₂ and R₃ are the same or are different and each represents an alkyl group containing not more than four carbon atoms.

The aforesaid compounds are valuable pesticides and systemic insecticides.

The present invention provides a new phosphorus derivative within the field of the general Formula I above which has exceptionally valuable properties, being the compound of the formula:

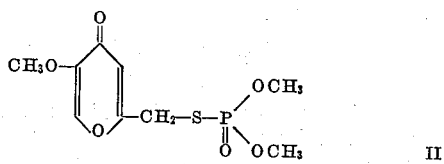

II i. e. 2-(dimethoxy-phosphinylthiomethyl)-5-methoxy-γ-pyrone.

The said compound may be obtained, according to a feature of the present invention, by reacting a salt of the general formula

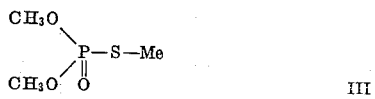

III where Me represents an alkali metal such as sodium or potassium, with a derivative of γ-pyrone of the general formula

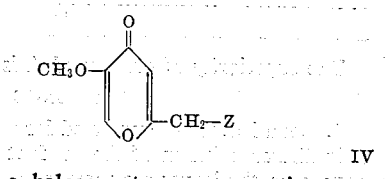

IV where Z represents a halogen atom or a reactive ester group such as a sulphate or sulphonate group. The salts of general Formula III can exist in two tautomeric forms

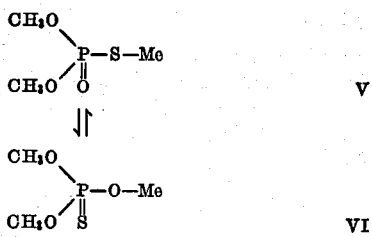

V

VI (Mastin and coll. J. A. C. S. 67, 1662 (1945), but they react with alkyl halides in tautomeric form V (G. Schrader, Die Entwicklung neuer Insektizide auf Grundlage organischer Fluor- und Phosphor-Verbindungen, 2d edition, Verlag Chemie-Weinheim/Bergstrasse, 1952, p. 76). They can be prepared in situ by the action of flowers of sulphur on dimethylphosphite of the formula:

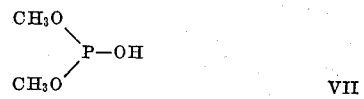

VII in the presence of an alkali metal derivative of ethyl alcohol.

The reaction is preferably effected in an organic solvent medium of which preferred examples are aliphatic alcohols and aliphatic ketones. It is convenient to employ a reaction temperature between 50° and 100° C., and preferably in the neighbourhood of the boiling point of the solvent employed. The reaction can also be effected outside this temperature range but no particular advantage results therefrom.

The new ester has been found interesting as a pesticide, and more especially as a systemic insecticide, as a systemic acaricide and as a contact acaricide. It may be employed in any of the physical forms in which pesticides are customarily used, normally in association with at least one inert diluent. Thus, it may be used in the form of a solid composition i. e. in admixture with solid diluents, such as talc, kaolin or other inert solids. It may also be formulated as an aerosol, emulsion or solution in water or in organic or aqueous-organic medium. The emulsions or solutions may contain wetting agents, dispersing agents or emulsifiers of the ionic or non-ionic type, the latter being preferred since they are not affected by electrolytes.

When it is desired to use an emulsion, the ester may be formulated as a self-emulsifying concentrate containing the active substance dissolved in the dispersing agent or in a solvent compatible with the dispersing agent, the composition being made ready for use by the simple addition of water. The new compound of this invention may also be employed in mixture with other insecticides, including substances having a synergistic effect. Pesticidal compositions containing the new compound as the active ingredient or as one of the active ingredients in association with a diluent as aforesaid are also within the scope of the present invention.

The following examples will serve to illustrate the production and use of the new compound but are not to be regarded as limiting the invention in any way:

EXAMPLE I 50 cc. of a 2 N solution of sodium methylate in methyl alcohol are added drop by drop to a suspension prepared from 150 cc. of benzene, 5.2 g. of sulphur and 13.2 g. of dimethylphosphite, the temperature being maintained below 5° C. When the addition is complete, the residual sulphur is filtered off and the solution obtained is added, drop by drop over a period of 3 hours, to a mixture prepared from 17.5 g. of 2-chloromethyl-5-methoxy-4-pyrone, 1.5 g. of sodium iodide and 250 cc. of methyl ethyl ketone. After standing for one night at room temperature and filtration of the salt formed in the course of the reaction, the reaction mixture is concentrated under a pressure of 20 to 30 mm. Hg at a temperature of 40–50° C. A viscous liquid weighing 28 g. is obtained, which crystallises on cooling. The solid obtained is dissolved in 150 cc. of boiling benzene and treated with 1 g. of decolourising charcoal. This mixture is allowed to cool in water to about 10° C. and seeded, whereby an abundant precipitate of 2 - (OO-dimethylthiolophosphoryl - methyl)-5-methoxy-4-pyrone is obtained, M. P. 72–74° C. The product obtained may be crystallised once more from benzene, and then melts at 74–76° C.

EXAMPLE II

A mixture of 124.1 g. of 2-hydroxymethyl-5-methoxy-4-pyrone-p-toluenesulphonate in 500 cc. of methyl ethyl ketone is vigorously agitated, 70 g. of sodium dimethyl-thionophosphate (concentration 95%) are added all at once, and the mixture is agitated for 4½ hours at the room temperature. After standing for one night, the toluenesulphonate precipitate formed is filtered off, and the product is washed with 3×100 cc. of methyl ethyl ketone. The solution obtained is treated with 3 g. of decolourising charcoal and concentrated as indicated in Example I. The remaining solid is finally dried in vacuo in the presence of sulphuric acid. There then remains a white solid weighing 108 g. and melting at 74–75° C. Analysis of this product shows that it is 2-(OO-dimethylthiolophosphorylmethyl) - 5 - methoxy - 4 - pyrone, and is identical with the product prepared in Example I.

The sodium OO-dimethylthionophosphate employed as starting material is prepared by adding a 3.2 N solution of sodium methylate in methyl alcohol at about 0 to 5° C. to a suspension of 224.4 g. of dimethylphosphite, 400 cc. of methyl alcohol and 64 g. of flowers of sulphur. When the addition is complete and the residual sulphur has been filtered off, the solution is concentrated under a pressure of 20–30 mm. Hg and a temperature of 45° C. The remaining solid is dried at 45° C. under a pressure of 30 mm. of mercury for one night. Yield 328 g. being 95% of that theoretically possible.

EXAMPLE III 15 g. of 2(OO-dimethylthiolophosphorylmethyl)-5-methoxy-4-pyrone are dissolved in 30 cc. of ethyl alcohol and 15 cc. of acetone, and 45 cc. of Scurol "O" and 12 cc. of terpinolene are added to the solution obtained. The solution obtained is made up to 150 cc. with ethyl alcohol. This solution, which contains 10 g. of active product per 100 cc., is used after appropriate dilution to combat aphides and red spiders.

EXAMPLE IV

The procedure of Example III is followed, but the ethyl alcohol is replaced by acetone.

As stated above, the compound of this invention, being the compound of Formula II above, is of outstanding value as a pesticide, particularly as a systemic insecticide, as a systemic acaricide and as a contact acaricide. In illustration of these properties the following data compares the said compound of Formula II hereinafter referred to as A with the compound of closest comparable chemical structure described in application Ser. No. 496,941 which is

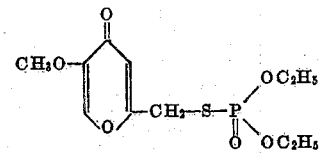

which is hereinafter referred to as compound B.

*Systemic aphicidal action*

These tests were carried out with the black bean aphis, the "*Aphis rumicis*" on nasturtium dwarf (Tom Thumb) mixed. The nasturtiums used are in a well-defined stage of development (4 days at 25° C., followed by 4 days in a strongly lit open cupboard). These nasturtiums are carefully pulled up and the roots are well washed. The roots are then immersed in test tubes containing the solution to be studied. The tube is closed by a cotton wool plug to reduce the evaporation to a minimum. Two days later, the plant is contaminated with aphides which are placed in groups of 5 in small glass cells on the primary leaves, and the mortalities are observed. The following table gives the $CL_{50}$ values (i. e. the concentrations which result in 50% mortality) in mg./l. calculated on the adults and on the larvae after a number of periods of time.

| Product | Number of hours after the beginning of the test | $CL_{50}$, mg./l. | |
|---|---|---|---|
| | | Adults | Larvae |
| A | 23 | >0.4 | >0.4 |
| | 50 | 0.1 | 0.15 |
| | 114 | 0.05 | 0.07 |
| B | 23 | >0.4 | >0.4 |
| | 50 | 0.3 | 0.4 |
| | 114 | 0.15 | 0.15 |

It will be noted that substantially lower concentrations of A are effective at the longer periods.

*Systemic acaricidal action*

Beanstalks, the leaves of which are freshly contaminated by red spiders (*Tetranychus telarius*) have their roots immersed in the solution to be studied. Leaves are removed after 5 days and the dead and living insects are counted. The percentage of mortality is calculated therefrom:

| Concentrations, mg./l. | Percentages of Mortality | |
|---|---|---|
| | Product A | Product B |
| 100 | 100 | 100 |
| 10 | 100 | 0 |
| 1 | 50 | 0 |
| 0.1 | 0 | 0 |

It will be noted that a 100% mortality is achieved by compound A at 1/10 of the concentration of that required for compound B.

*Contact acericidal action*

SPRAY TEST

A suitably diluted solution of the concentrate produced according to Example III is sprayed on to the two faces of bean leaves previously contaminated by red spiders (*Tetranychus telarius*). The mortality is noted at the end of 48 hours. The following table summarises the percentages of mortality obtained on adults and on larvae having eight patellae, the results for product B being given by way of comparison:

| Products | Concentrations, mg./l. | Percent mortality | |
|---|---|---|---|
| | | Adults | Larvae |
| A | 5 | 100 | 100 |
| | 1 | 100 | 100 |
| B | 5 | 100 | 100 |
| | 1 | 70 | 40 |

The superiority of compound A is apparent.

PERSISTENCE

1. Bean leaves are immersed for a short while in a suitably diluted solution of the product to be studied. Five days later, the leaves are removed and contaminated with red spider (*Tetranychus telarius*). The mortality is observed after 5 days on adults and on larvae having eight patellae. The following table summarises the percentages of mortality obtained:

| Concentrations, mg./l. | Products | | | |
|---|---|---|---|---|
| | A | | B | |
| | Adults | Larvae | Adults | Larvae |
| 400 | 100 | 100 | 100 | 100 |
| 200 | 100 | 100 | 45 | 20 |
| 100 | 90 | 90 | 15 | 15 |
| 50 | 75 | 55 | 0 | 0 |

The much greater persistence of effect of compound A is apparent.

2. Broad bean plants highly contaminated with aphides are treated by spraying with a solution containing 25 g. of compound A to 100 litres of water. 4 hours after the treatment, total mortality is observed. Eight days later, the broad bean plants are again contaminated with aphides and it is found that mortality has reached 100% in 3 hours.

A similar experiment made a fortnight after the first treatment gives a 60% mortality of the aphides after a period of 24 hours.

When a solution containing 50 g. of compound A to 100 litres of water is employed for the initial treatment, a mortality of 100% is found in 3 to 4 hours in the case of observations made immediately and 8 days after the treatment. A fortnight after the initial spraying, mortality reaches 100% in 24 hours.

These tests show that the product A of the present invention has greater activity than the closest product B of application Ser. No. 496,941, both from the standpoint of intensity of action and from the standpoint of the duration of the action. Moreover, compound A has the advantage of reduced toxicity as shown by the following data:

(a) ACUTE TOXICITY ON MICE

The dose given per os which produces 50% mortality ($DL_{50}$) is determined.

Product A: $DL_{50}$ = 35 mg./kg.
Product B: $DL_{50}$ = 15 mg./kg.

(b) ACUTE PERCUTANEOUS TOXICITY ON THE RABBIT

This determination permits of assessing the danger to the user of poisoning by percutaneous resorption. It is expressed in the same manner as in (a) above:

Product A: $DL_{50}$ = 400 mg./kg.
Product B: $DL_{50}$ = 10–15 mg./kg.

I claim:
1. The compound of the formula

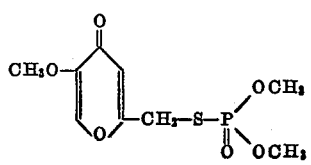

2. A process for the production of the compound of the formula

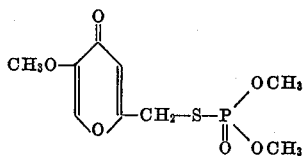

which comprises reacting a salt of the general formula

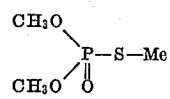

where Me represents an atom of an alkali metal with a compound of the formula

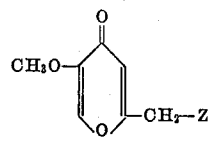

where Z is a radical selected from the group consisting of halogen, sulphate and sulfonate.

3. A process for the production of the compound of the formula

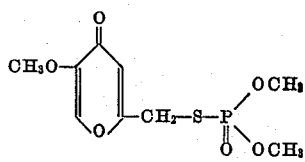

which comprises reacting a salt of the general formula

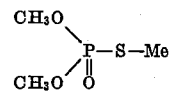

where Me represents an atom of an alkali metal with a compound of the formula

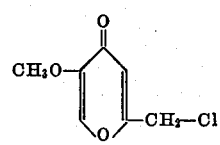

4. A pesticidal composition containing as the active ingredient the compound of the formula:

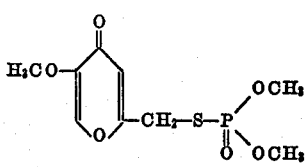

in association with an inert diluent.

No references cited.